(12) United States Patent
Nishimura

(10) Patent No.: US 11,113,314 B2
(45) Date of Patent: Sep. 7, 2021

(54) SIMILARITY CALCULATING DEVICE AND METHOD, AND RECORDING MEDIUM

(71) Applicant: NEC Corporation, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 16/310,845

(22) PCT Filed: Jun. 19, 2017

(86) PCT No.: PCT/JP2017/022440
§ 371 (c)(1),
(2) Date: Dec. 18, 2018

(87) PCT Pub. No.: WO2017/221857
PCT Pub. Date: Dec. 28, 2017

(65) Prior Publication Data
US 2019/0179836 A1 Jun. 13, 2019

(30) Foreign Application Priority Data
Jun. 21, 2016 (JP) .............................. JP2016-122509

(51) Int. Cl.
G06F 15/00 (2006.01)
G06F 16/28 (2019.01)
(Continued)

(52) U.S. Cl.
CPC ............ *G06F 16/285* (2019.01); *G06F 16/00* (2019.01); *G06F 16/182* (2019.01); *G06F 16/2272* (2019.01); *G06F 16/9035* (2019.01)

(58) Field of Classification Search
CPC ...... G06F 16/285; G06F 16/00; G06F 16/182; G06F 16/2272; G06F 16/9035
See application file for complete search history.

(56) References Cited

U.S. PATENT DOCUMENTS

2008/0120292 A1* 5/2008 Sundaresan ........... G06F 16/951

FOREIGN PATENT DOCUMENTS

| JP | 11242688 A | 9/1999 |
|----|------------|--------|
| JP | 2005222329 A | 8/2005 |

(Continued)

OTHER PUBLICATIONS

Liu, J., et al., "Efficient similarity search using tree structure index based on hierarchical relation of similarities", the 5th Forum on Data Engineering and Information Management, May 31, 2013, pp. 1-8.

(Continued)

*Primary Examiner* — Paul Kim

(57) ABSTRACT

A similarity index storage unit stores a similarity index in which nodes storing attribute values related to similarities among data are hierarchically arranged so as to indicate similarity relationships among the data. A label generation unit generates a label for each data, said label being based on paths which indicate the positions of the nodes storing the attribute values related to similarities in the similarity index. A similarity calculation unit reconfigures, on the basis of the label, the similarity index of data indicated by all or a portion of information associating the attribute values related to similarities with the label, and executes similarity-based calculation of the all or partial data by using the reconfigured similarity index.

5 Claims, 16 Drawing Sheets

(51) Int. Cl.
*G06F 16/00* (2019.01)
*G06F 16/182* (2019.01)
*G06F 16/22* (2019.01)
*G06F 16/9035* (2019.01)

(56) References Cited

FOREIGN PATENT DOCUMENTS

| | | | |
|---|---|---|---|
| JP | 2013239050 | A | 11/2013 |
| JP | 2014197412 | A | 10/2014 |
| WO | 2012164735 | A1 | 12/2012 |

OTHER PUBLICATIONS

Written Opinion, dated Aug. 22, 2017 from the International Bureau in counterpart International application No. PCT/JP2017/022440.
International Search Report, dated Aug. 22, 2017 from the International Bureau in counterpart International application No. PCT/JP2017/022440.

* cited by examiner

| TIME | LABEL OF CHARACTERISTIC AMOUNT |
|---|---|
| 10:00 | a1-b2-c3 |
| 10:05 | a1-b2-c4 |
| 10:07 | a2-d3-d5-e6 |
| 10:08 | a7-e9-f3 |
| 11:03 | a3-b2-c3 |
| 11:05 | a4-b2-c4 |
| 11:07 | a8-d3-d5-e6 |
| 11:08 | a1-e8 |
| ... | |

Fig.18

| TIME | LABEL OF CHARACTERISTIC AMOUNT |
|---|---|
| 10:00 | a1-b2-c3 |
| 10:05 | a1-b2-c4 |
| 10:07 | a2-d3-d5-e6 |
| 10:08 | a7-e9-f3 |
| ... | |

| TIME | LABEL OF CHARACTERISTIC AMOUNT |
|---|---|
| 11:03 | a3-b2-c3 |
| 11:05 | a4-b2-c4 |
| 11:07 | a8-d3-d5-e6 |
| 11:08 | a1-e8 |
| ... | |

# SIMILARITY CALCULATING DEVICE AND METHOD, AND RECORDING MEDIUM

This application is a National Stage Entry of PCT/JP2017/022440 filed on Jun. 19, 2017, which claims priority from Japanese Patent Application 2016-122509 filed on Jun. 21, 2016, the contents of all of which are incorporated herein by reference, in their entirety.

TECHNICAL FIELD

The present invention relates to a technique of performing a similarity-based calculation for data.

BACKGROUND ART

There is a technique of performing a similarity-based calculation for data. For example, similar combinations are known as one example of the similarity-based calculation. The similar combinations are a calculation for, when two pieces of data are within a predetermined similarity range in a data set, bringing the pieces of data into one. For example, in the case where two face images are present, the similar combinations perform such a calculation as to bring the face images into one when the faces are so similar as to be considered as the same person, and separate the face images as different persons otherwise.

Generally, as a scale of a data set increases, cost for a similarity-based calculation rises. Thus, a measure is taken to divide a data set, and execute a similarity-based calculation by a plurality of processors. A problem occurring in this instance is how to divide a data set, and how to achieve a similarity-based calculation between data across divided sub data sets.

One example of a technique related to the above-described problem is described in PTL 1. This related technique is premised that an attribute of targeted data is a multidimensional value, and that a value of each dimension can be referred to. Under this premise, this related technique constructs a similarity index called an ε-k-d tree. The ε-k-d tree allows each stage of the tree to correspond to each dimension of data. For example, a first-stage node which is a child node of a root node corresponds to a first dimension, and a second-stage node group which is a child node of the first-stage node corresponds to a second dimension. Then, at each stage, a node which data are to enter is determined in an order in which data are sorted by a value of a dimension corresponding to the stage. Since data are sorted by a value of a certain dimension at each stage, the similar combinations need only to target data in a node and data among adjacent nodes. Using this property of the ε-k-d tree, this related technique divides a data set for each sub tree at a certain stage and below in the ε-c-k-d tree. Then, this related technique executes similar combinations in a sub tree, and performs, between adjacent sub trees, similar combinations of data present at leftmost and rightmost nodes of the respective sub trees.

Furthermore, PTL 2 describes another example of a technique related to the above-described problem. This related technique executes a search for data similar to given data as a similarity-based calculation by use of a classification search tree. Specifically, this related technique generates a classification search tree, based on a keyword automatically or manually tagged with data. The classification search tree includes a data-classifying classifier configured on the tree. Further, this related technique classifies given data by the classifier of the classification search tree, and then continues to classify the data by a low-level classifier, thereby searching for similar data. Thus, this related technique increases efficiency of search processing by limiting search processing of data similar to given data to a range along a branch of the classification search tree.

CITATION LIST

Patent Literature

[PTL 1] Japanese Unexamined Patent Application Publication No. H11-242688
[PTL 2] Japanese Unexamined Patent Application Publication No. 2014-197412

SUMMARY OF INVENTION

Technical Problem

However, the above-described related techniques have the following problems.

In some cases, it is necessary to perform a calculation based on a similarity of data, not for the whole given data set, but for any subset.

However, in the related technique described in PTL 1, each of a plurality of processors stores a sub tree at a certain stage and below in an ε-c-k-d tree in a memory as a local similarity index, and targets the sub tree for a calculation. Therefore, when it is necessary to perform a similarity-based calculation for any subset different from a subset represented by a local similarity index, this related technique needs to integrate local similarity indices in the memories referred to by respective processors into one. Since structures of local similarity indices are greatly dependent on data inserted therein, cost for this integration operation is substantially equivalent to cost of newly constructing a similarity index. Particularly, when it is assumed that a plurality of processors and memories are placed in a distributed environment, this integration operation aggregates corresponding data in one place, and then reconstructs a similarity index, thus becoming a factor of significantly deteriorating performance.

Furthermore, the related technique described in PTL 2 searches for similar data along a classification search tree constructed for a data set, but does not describe searching any subset of the data set for similar data. Therefore, in this case, this related technique needs to reconstruct a classification search tree for any subset, thus becoming a factor of deteriorating performance.

The present invention has been made in order to solve the problems described above. In other words, the present invention is intended to provide a technique which facilitates reconstruction of a similarity index related to a subset of any data, in a similarity index used when a calculation based on a similarity of data is performed.

Solution to Problem

To achieve the purpose above, a similarity calculating device of the present invention includes similarity index storage means for storing a similarity index in which a node storing an attribute value related to a similarity of data is hierarchically configured in such a way as to represent a similarity relation between the data; label generation means for generating, for each piece of the data, a label based on a path indicating a position of the node storing the attribute value in the similarity index; data storage means for storing, for each piece of the data, information associating the attribute value with the label; and similarity calculation means for, for data indicated by whole or part of the information stored in the data storage means, reconfiguring the similarity index, based on the label, and executing a similarity-based calculation targeted for the whole or part of the data by use of the reconfigured similarity index.

A method of the present invention is implemented by a computer device. The method includes, by use of a similarity index in which a node storing an attribute value related to a similarity of data is hierarchically configured in such a way as to represent a similarity relation between the data: generating, for each piece of the data, a label based on a path indicating a position of the node storing the attribute value in the similarity index; storing, for each piece of the data, information associating the attribute value with the label in data storage means; and reconfiguring, for data indicated by whole or part of the information stored in the data storage means, the similarity index, based on the label, and executing a similarity-based calculation targeted for the whole or part of the data by use of the reconfigured similarity index.

A recording medium of the present invention stores a program which causes a computer device to execute, by use of a similarity index in which a node storing an attribute value related to a similarity of data is hierarchically configured in such a way as to represent a similarity relation between the data: a label generation step of generating, for each piece of the data, a label based on a path indicating a position of the node storing the attribute value in the similarity index; a data storage step of storing, for each piece of the data, information associating the attribute value with the label in data storage means; and a similarity calculation step of, for data indicated by whole or part of the information stored in the data storage means, reconfiguring the similarity index, based on the label, and executing a similarity-based calculation targeted for the whole or part of the data by use of the reconfigured similarity index.

Advantageous Effects of Invention

The present invention is able to provide a technique which facilitates reconstruction of a similarity index related to a subset of any data, in a similarity index used when a calculation based on a similarity of data is performed.

BRIEF DESCRIPTION OF DRAWINGS

FIG. 18 is a diagram illustrating another example of information stored in the data storage unit in a specific example of the fourth example embodiment of the present invention.

EXAMPLE EMBODIMENT

Hereinafter, example embodiments of the present invention will be described in detail with reference to the drawings.

First Example Embodiment

Figure 1:
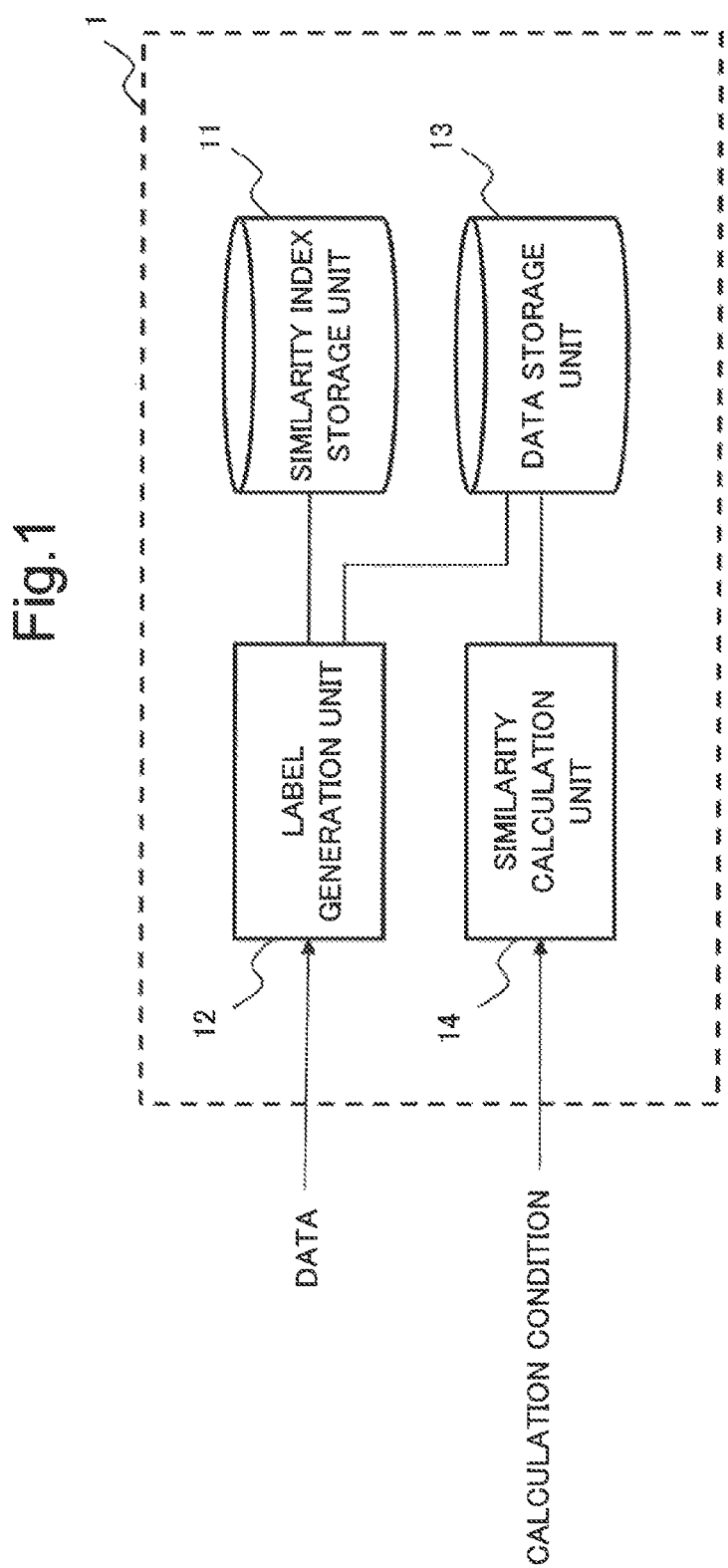
FIG. 1 is a block diagram illustrating a configuration of a similarity calculation device as a first example embodiment of the present invention.

A functional block configuration of a similarity calculation device 1 as a first example embodiment of the present invention is illustrated in FIG. 1. In FIG. 1, the similarity calculation device 1 includes a similarity index storage unit 11, a label generation unit 12, a data storage unit 13, and a similarity calculation unit 14.

Figure 2:
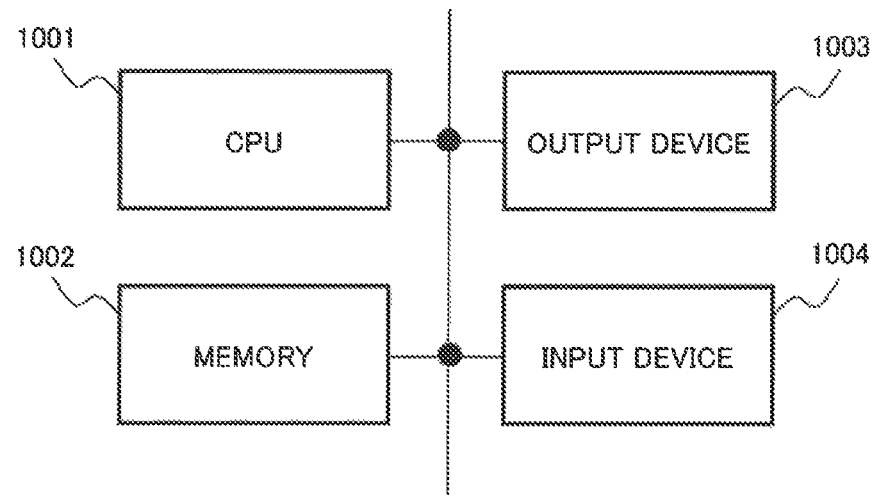
FIG. 2 is a diagram illustrating one example of a hardware configuration of the similarity calculation device as the first example embodiment of the present invention.

Herein, the similarity calculation device 1 is able to be configured by a hardware element as illustrated in FIG. 2. In FIG. 2, the similarity calculation device 1 includes a central processing unit (CPU) 1001, a memory 1002, an output device 1003, and an input device 1004. The memory 1002 is configured by a random access memory (RAM), a read only memory (ROM), an auxiliary storage device (a hard disk or the like), or the like. The output device 1003 is configured by a device which outputs information, such as a display device, a printer, or the like. The input device 1004 is configured by a device which accepts an input of a user operation, such as a keyboard, a mouse, or the like. In this case, the similarity index storage unit 11 and the data storage unit 13 are configured by the memory 1002. Moreover, the label generation unit 12 and the similarity calculation unit 14 are configured by the CPU 1001 which reads and executes a computer program stored in the memory 1002, and controls each unit such as the output device 1003 or the input device 1004. Note that hardware configurations of the similarity calculation device 1 and each functional block thereof are not limited to the configurations described above.

The similarity index storage unit 11 stores a similarity index. A similarity index is information in which a node having an attribute value related to a similarity of data stored therein is hierarchically configured in such a way as to represent a similarity relation between the data. Note that, a similarity index may store, in a node, an attribute value itself related to a similarity of data, or information for reference to an attribute value related to a similarity.

For example, a similarity index may be configured in such a way that an attribute value, which is related to a similarity of another piece of data and is determined to be similar to an attribute value related to a similarity of certain data stored in a certain node, is stored in a node under the certain data in the certain node. Moreover, in this case, for one or a plurality of pieces of data, an attribute value related to a similarity thereof is stored in each node. Additionally, in this instance, a condition indicating that a similarity is higher in a lower hierarchical layer is applied as a condition for determining whether or not data include a similarity. Thereby, each node stores an attribute value related to a similarity of one or more pieces of more similar data in a lower hierarchical layer. Further, in each node, attribute values related to similarities of one or more pieces of data to be stored may be placed in an order of similarities to data in a parent node.

The label generation unit 12 generates, for each piece of data, a label based on a path indicating a position of a node having an attribute value related to a similarity in a similarity index stored therein. Then, the label generation unit 12 stores information associating an attribute value related to a similarity of data with the generated label in the data storage unit 13 described later.

Herein, a path is represented by arrangement of nodes from a root node to a node having an attribute value related to a similarity of corresponding data stored therein. For example, a label may be a link of information for identifying nodes included in a path, as character strings in an order of arrangement in the path. Moreover, as described above, it is assumed that, in each node, attribute values related to similarities of one or more pieces of data to be stored are placed in arrangement of similarities to data in a parent node. In this case, a path is represented by arrangement of information representing nodes and a placement order in the nodes from a root node to a corresponding node. In this case, a label may be a link of information representing nodes included in a path and a placement order thereof, as character strings in an order of arrangement in the path.

For example, the label generation unit 12 acquires an attribute value related to a similarity of target data as an input. Then, the label generation unit 12 needs only to determine which node of a similarity index to store the acquired attribute value related to the similarity, and store the attribute value in the determined node. In this instance, when a node which can store the acquired attribute value related to the similarity is already included in the similarity index, the label generation unit 12 stores the attribute value related to the similarity in the node. Moreover, when a node which can store the acquired attribute value related to the similarity is not included in the similarity index yet, the label generation unit 12 newly generates a node, and then stores the attribute value related to the similarity in the generated node. Hereinafter, "storing an attribute value related to a similarity of data in an existing or new node in a similarity index" is also described as "inserting an attribute value related to a similarity of data into a node of a similarity index". Then, the label generation unit 12 needs only to obtain a path from a root node to a node into which the attribute value is inserted in a similarity index, and generate a label, based on the obtained path.

The data storage unit 13 stores an attribute value related to a similarity and a label in association with each other for each piece of data. For example, the data storage unit 13 may provide a column which stores a label, in a record that stores an attribute value related to a similarity, for each piece of data. Note that the data storage unit 13 may store data in any format by any scheme that makes it possible to identify association of an attribute value related to a similarity of data with a label. Alternatively, the data storage unit 13 may store, distributedly in a plurality of blocks, information associating an attribute value related to a similarity of each piece of data with a label. Moreover, in such a case, the respective blocks may be distributed into a plurality of physically different devices (e.g., a plurality of memories 1002).

The similarity calculation unit 14 reconfigures a similarity index by use of a label for all or part of the data stored in the data storage unit 13. Then, the similarity calculation unit 14 executes a similarity-based calculation for all or part of the data by use of the reconfigured similarity index. For example, the similarity calculation unit 14 may acquire a calculation condition as an input. Then, the similarity calculation unit 14 may execute a similarity-based calculation by use of the reconfigured similarity index, based on the acquired calculation condition.

Specifically, the similarity calculation unit 14 sorts all or part of the data stored in the data storage unit 13, based on a label. Since a label represents a path in a similarity index, a similarity index is reconfigured by sorting.

Furthermore, for example, a similarity-based calculation may be similar combinations. In this case, the similarity calculation unit 14 may acquire a condition of similar combinations as an input, and perform a calculation of similar combinations in the reconfigured similarity index by use of the condition of similar combinations. Note that a publicly known technique which achieves similar combinations by use of a similarity index is applicable to similar combinations.

An operation of the similarity calculation device 1 configured as above is described with reference to the drawings.

Figure 3:
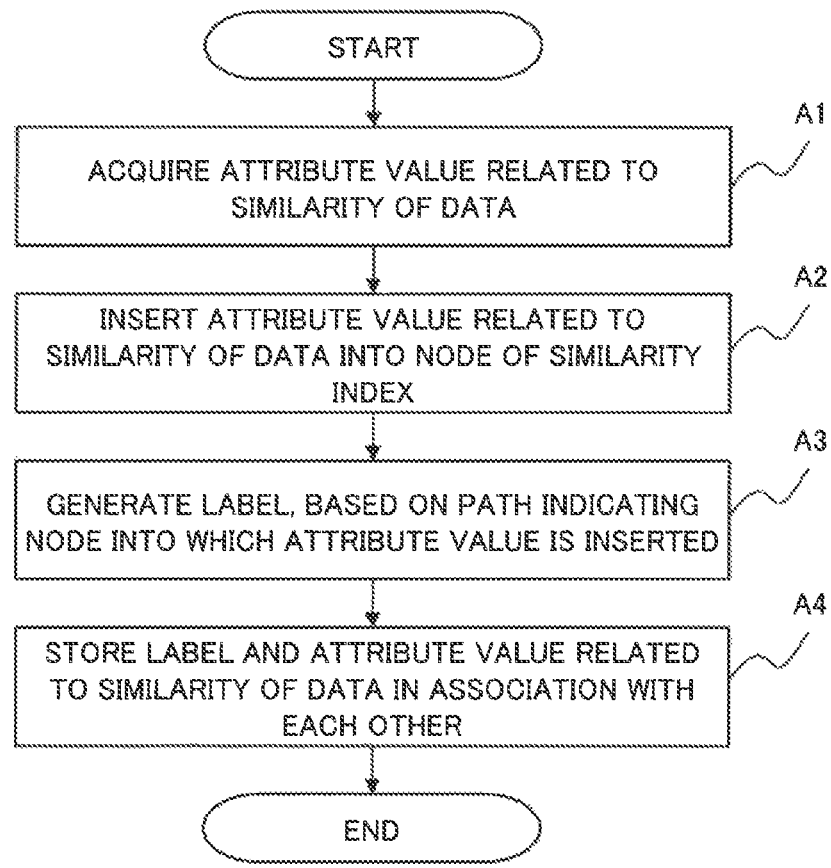
FIG. 3 is a flowchart illustrating an operation in which the similarity calculation device as the first example embodiment of the present invention stores information in a data storage unit.

First, an operation in which the similarity calculation device 1 stores information in the data storage unit 13 is illustrated in FIG. 3.

In FIG. 3, first, the label generation unit 12 acquires an attribute value related to a similarity of target data (step A1).

Then, the label generation unit 12 inserts the acquired attribute value related to the similarity into a node of a similarity index stored in the similarity index storage unit 11 (step A2).

Then, the label generation unit 12 generates a label, based on a path indicating the node into which the attribute value related to the similarity is inserted (step A3).

Next, the label generation unit 12 stores information associating the generated label with the acquired attribute value related to the similarity in the data storage unit 13 (step A4).

Accordingly, the similarity calculation device 1 ends the operation of storing information in the data storage unit 13.

Figure 4:
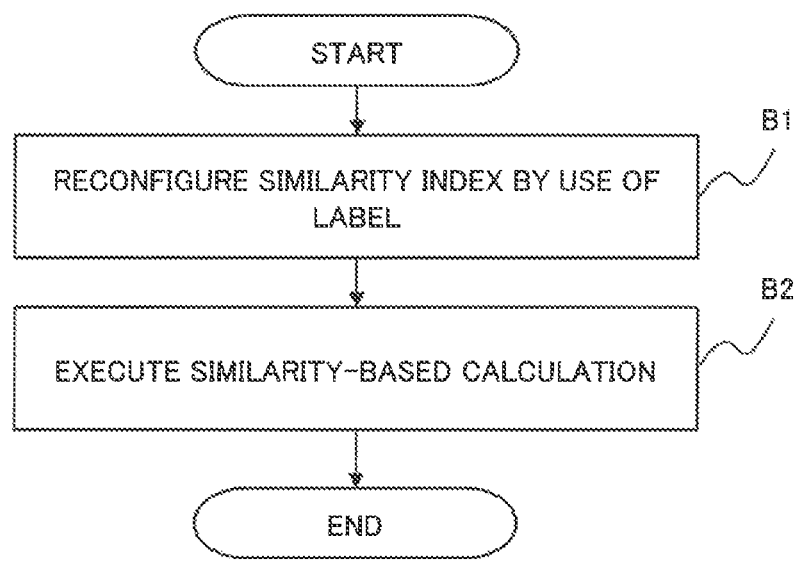
FIG. 4 is a flowchart illustrating an operation in which the similarity calculation device as the first example embodiment of the present invention executes a similarity-based calculation.

Next, an operation in which the similarity calculation device 1 performs a similarity-based calculation is illustrated in FIG. 4.

In FIG. 4, first, the similarity calculation unit 14 reconfigures a similarity index by use of a label for data targeted for a calculation among data indicated by information stored in the data storage unit 13 (step B1). Note that, target data may be data indicated by all the information stored in the data storage unit 13, or data indicated by part of the information.

Next, the similarity calculation unit 14 executes a similarity-based calculation for a set of data targeted for a calculation, by use of the reconfigured similarity index (step B2).

For example, as described above, the similarity calculation unit 14 may perform a similarity-based calculation, based on a calculation condition acquired as an input. Alternatively, as described above, the similarity calculation unit 14 may perform similar combinations as a similarity-based calculation.

Accordingly, the similarity calculation device 1 ends the operation of performing a similarity-based calculation.

Next, an operation by the similarity calculation device 1 is presented with a specific example. In the example described herein, similar combinations are applied as a similarity-related calculation.

Figure 5:
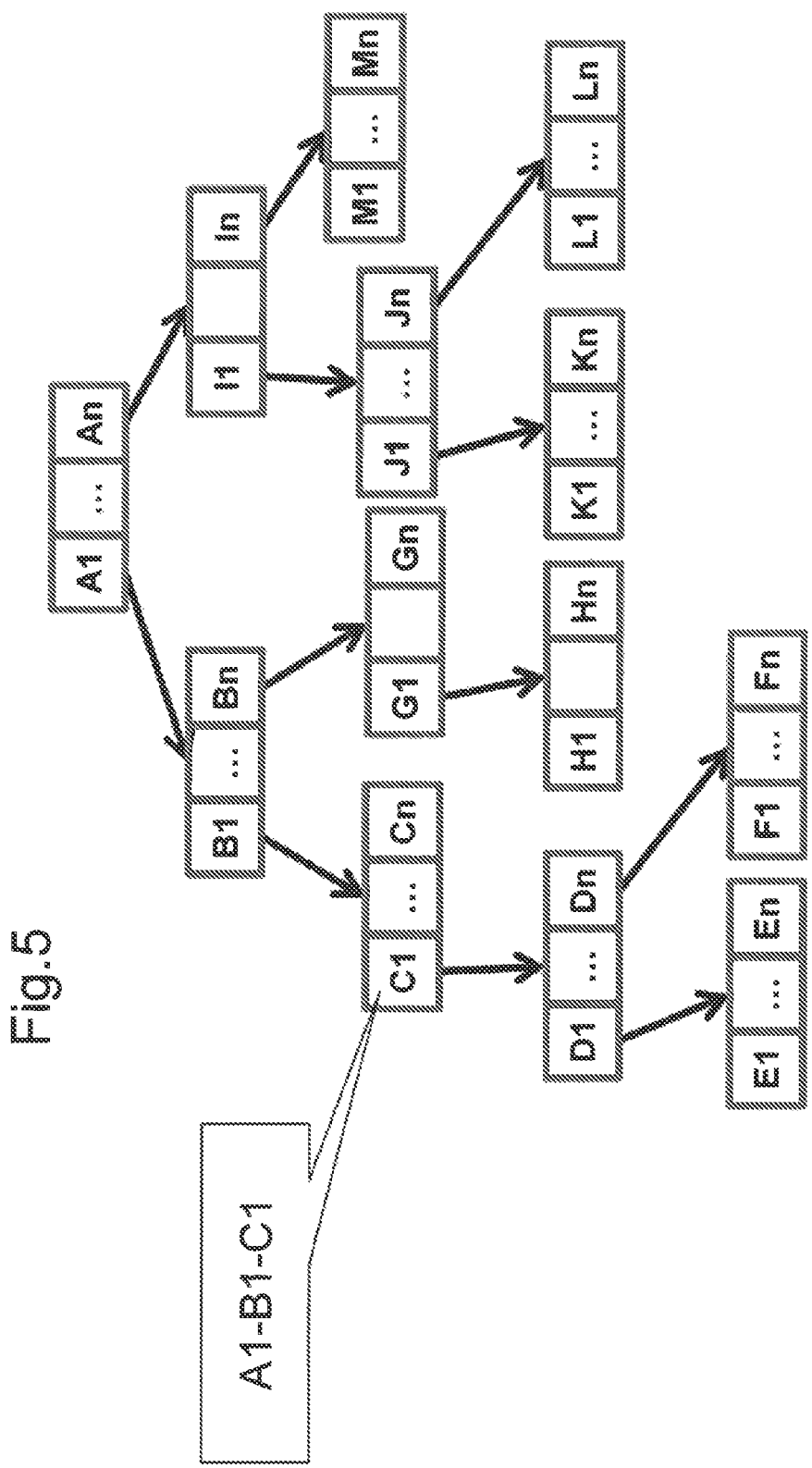
FIG. 5 is a diagram schematically illustrating a similarity index in a specific example of the first example embodiment of the present invention.

Additionally, in this specific example, it is assumed that the similarity index storage unit 11 stores a similarity index illustrated in FIG. 5. In FIG. 5, an oblong shape in which rectangles are linked represents a node. For example, an oblong shape in which rectangles A1 to An are linked represents a node A. Moreover, each rectangle represents an attribute value related to a similarity of each piece of data stored in the node. Further, a character string such as A1 or B1 surrounded by a rectangle represents a node and a placement order in the node. For example, A1 represents that a placement order in the node A is the first. Hereinafter, a placement order being the first in the node A is also described as a node A1. Note that, although n (n is an integer of 1 or more) data are stored in each node in the example illustrated in FIG. 5, a number of data stored in a certain node is not necessarily the same as a number of data stored in another node.

First, an operation in which information is stored in the data storage unit 13 in this specific example is described.

Herein, the label generation unit 12 acquires an attribute value related to a similarity of target data (step A1), and inserts the acquired attribute value related to the similarity into a node of a similarity index stored in the similarity index storage unit 11 (step A2). Herein, it is assumed that the acquired attribute value related to the similarity is inserted into a node C1.

Next, the label generation unit 12 generates a label, based on a path from a root node to the node C1 into which the attribute value is inserted (step A3). Herein, the path to the node C1 is represented by arrangement of information A1, B1, and C1 representing nodes and a placement order. Thus, by linking the information representing the nodes and the placement order as character strings in an order of arrangement of the information, the label generation unit 12 generates a label "A1-B1-C1". Note that, herein, a hyphen "-" is used as a linking character string.

Next, the label generation unit 12 stores, in the data storage unit 13, information associating the generated label "A1-B1-C1" with an attribute value related to a similarity of the data (step A4).

Accordingly, the description of the specific example of the operation in which information is stored in the data storage unit 13 is ended.

Next, an operation of performing similar combinations in this specific example is described. In this specific example, it is assumed that the data storage unit 13 stores, distributedly in a plurality of blocks, information associating an attribute value related to a similarity with a label. Moreover, in the example described herein, similar combinations are performed in a block.

First, the similarity calculation unit 14 reconfigures a similarity index by sorting information stored in the data storage unit 13 using a label for each block (step B1).

Specifically, the similarity calculation unit 14 sorts information stored in the data storage unit 13 in ascending order of character strings of a label. In arrangement of the information sorted in this way, length of a label represents depth of a hierarchical layer in a similarity index. Moreover, data having labels of the same length and continuing ahead and behind represent adjacent nodes in the same subtree. Therefore, the similarity calculation unit 14 is able to reconfigure a similarity index by sorting information stored in the data storage unit 13 with a label.

Next, the similarity calculation unit 14 executes similar combinations for each block by use of the reconfigured similarity index (step B2). For example, the similarity calculation unit 14 may perform similar combinations of adjacent nodes in the reconfigured similarity index.

In this way, in the specific example of the present example embodiment, the similarity calculation device 1 is able to easily reconfigure a similarity index for data in each block being a subset of data.

Accordingly, the description of the specific example is ended.

Next, an advantageous effect of the first example embodiment of the present invention is described.

In a similarity index used when a calculation based on a similarity of data is performed, a similarity calculation device as the first example embodiment of the present invention is able to easily reconfigure a similarity index related to a subset of any data.

A reason for this is described as follows. In the present example embodiment, a similarity index storage unit stores a similarity index in which a node having an attribute value related to a similarity of data stored therein is hierarchically configured in such a way as to represent a similarity relation between the data. Next, a label generation unit generates, for each piece of data, a label based on a path indicating a position of a node having stored therein an attribute value related to a similarity of the data in a similarity index. Then, the label generation unit stores information associating an attribute value related to a similarity with the label in a data storage unit for each piece of data. Moreover, a similarity calculation unit reconfigures a similarity index by use of a label for data indicated by all or part of the information stored in the data storage unit. Then, the similarity calculation unit executes a similarity-based calculation targeted for all or part of the data by use of the reconfigured similarity index.

Thus, the present example embodiment enables a similarity index to be easily reconfigured by referring to a label stored in a data storage unit, without referring to a similarity index in a similarity index storage unit.

Second Example Embodiment

Next, a second example embodiment of the present invention is described in detail with reference to the drawings. Note that, the same reference signs are given to the same configurations as those in the first example embodiment of the present invention and steps operating in a similar way in each drawing referred to in a description of the present example embodiment, and a detailed description in the present example embodiment is thus omitted.

Figure 6:
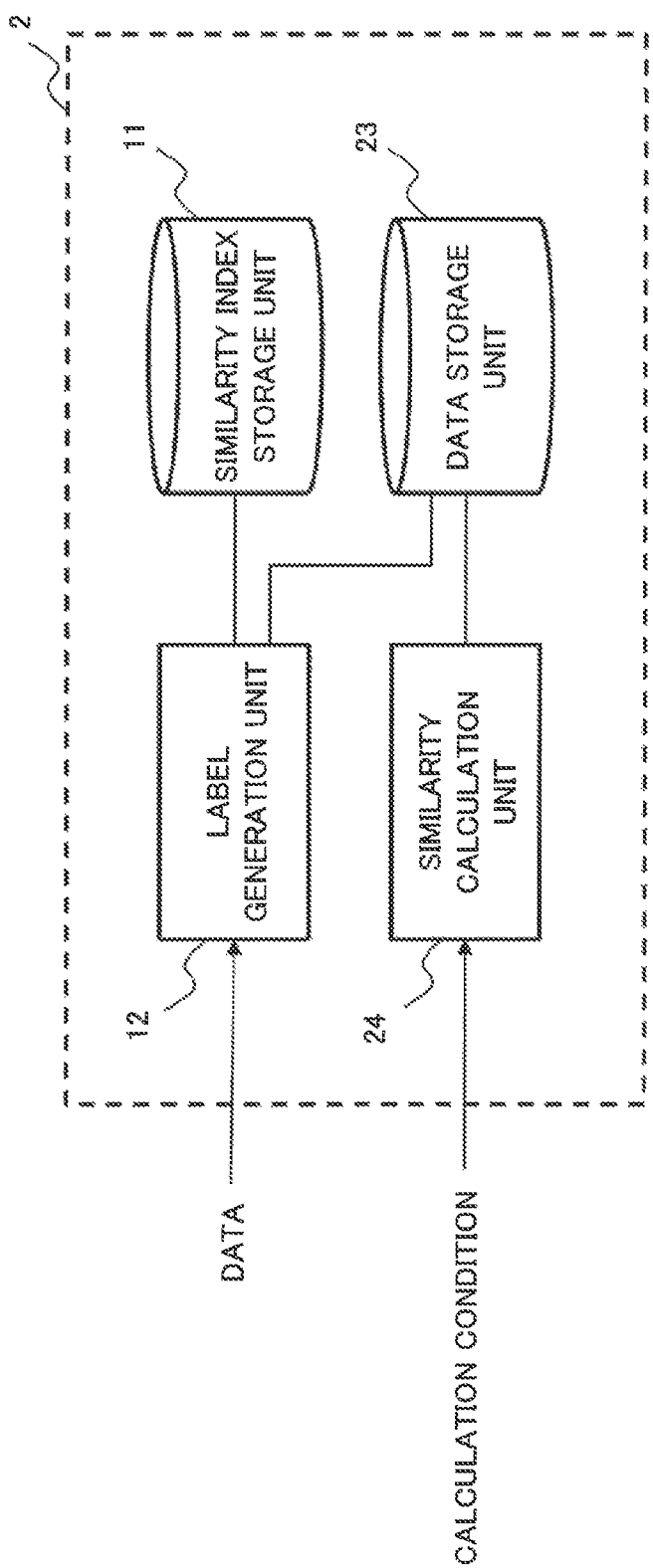
FIG. 6 is a block diagram illustrating a configuration of a similarity calculation device as a second example embodiment of the present invention.

First, a functional block configuration of a similarity calculation device 2 as the second example embodiment of the present invention is illustrated in FIG. 6. In FIG. 6, the similarity calculation device 2 is different from the similarity calculation device 1 as the first example embodiment of the present invention in that the similarity calculation device 2 includes a data storage unit 23 instead of the data storage unit 13, and a similarity calculation unit 24 instead of the similarity calculation unit 14. Note that the similarity calculation device 2 and each functional block thereof can be configured by the same hardware element as that in the first example embodiment of the present invention described with reference to FIG. 2. However, the hardware configurations of the similarity calculation device 2 and each functional block thereof are not limited to the configurations described above.

The data storage unit 23 stores, distributedly in a plurality of blocks, information associating an attribute value related to a similarity of data with a label. A publicly known technique is applicable to a scheme of distribution into a plurality of blocks.

The similarity calculation unit 24 redistributes the information associating the attribute value related to the similarity of the data with the label into a plurality of blocks, based on a prefix in the label. In other words, the similarity calculation unit 24 needs only to acquire data associated with labels including the same prefix from one or more blocks, and store the acquired data in the same block. For example, a character string representing a path to a predetermined hierarchical layer in a similarity index may be applied as a prefix among character strings of a label.

Then, based on the label, the similarity calculation unit 24 reconfigures a similarity index for data indicated by information stored in each block. Moreover, for data indicated by information stored in each block, the similarity calculation unit 24 executes a similarity-based calculation, by use of a similarity index of each block. Note that, when the similarity calculation unit 24 is configured by a plurality of CPUs 1001, each CPU 1001 may reconfigure a similarity index for a corresponding block, and perform a similarity-based calculation by use of the reconfigured similarity index.

An operation of the similarity calculation device 2 configured as above is described with reference to the drawings. Note that, an operation in which the similarity calculation device 2 stores information in the data storage unit 23 is similar to the operation in the first example embodiment of the present invention described with reference to FIG. 3, and a description in the present example embodiment is thus omitted.

Figure 7:
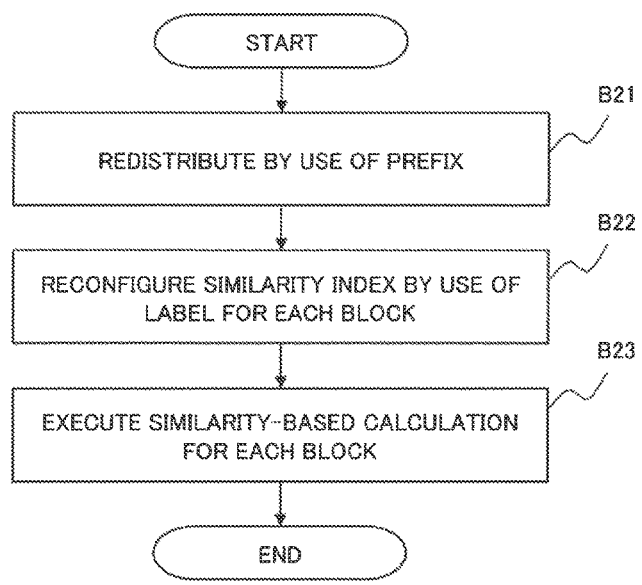
FIG. 7 is a flowchart illustrating an operation in which the similarity calculation device as the second example embodiment of the present invention executes a similarity-based calculation.

Herein, an operation in which the similarity calculation device 2 performs a similarity-based calculation is illustrated in FIG. 7.

In FIG. 7, first, the similarity calculation unit 24 redistributes information stored in the data storage unit 23 into a plurality of blocks, based on a prefix (step B21).

Next, for data indicated by information stored in each block, the similarity calculation unit 24 reconfigures a similarity index by use of a label (step B22).

Next, for data indicated by information stored in each block, the similarity calculation unit 24 executes a similarity-based calculation, by use of the reconfigured similarity index (step B23).

Accordingly, the similarity calculation device 2 ends the operation of performing a similarity-based calculation.

Next, an operation of the similarity calculation device 2 is presented with a specific example. In the example described herein, similar combinations are applied as a similarity-related calculation.

In this specific example, it is assumed that the data storage unit 23 stores, distributedly in a plurality of blocks, information associating data with a label by use of any dividing scheme. A case is described where, in this instance, similar combinations are performed across distributedly placed blocks. Moreover, it is assumed that a similarity index as in the specific example in the first example embodiment of the present invention described with reference to FIG. 5 is stored in the similarity index storage unit 11.

In this case, the similarity calculation unit 24 implements hash join with a prefix of a label as a key, for information stored in the data storage unit 23 (step B21).

Figure 8:
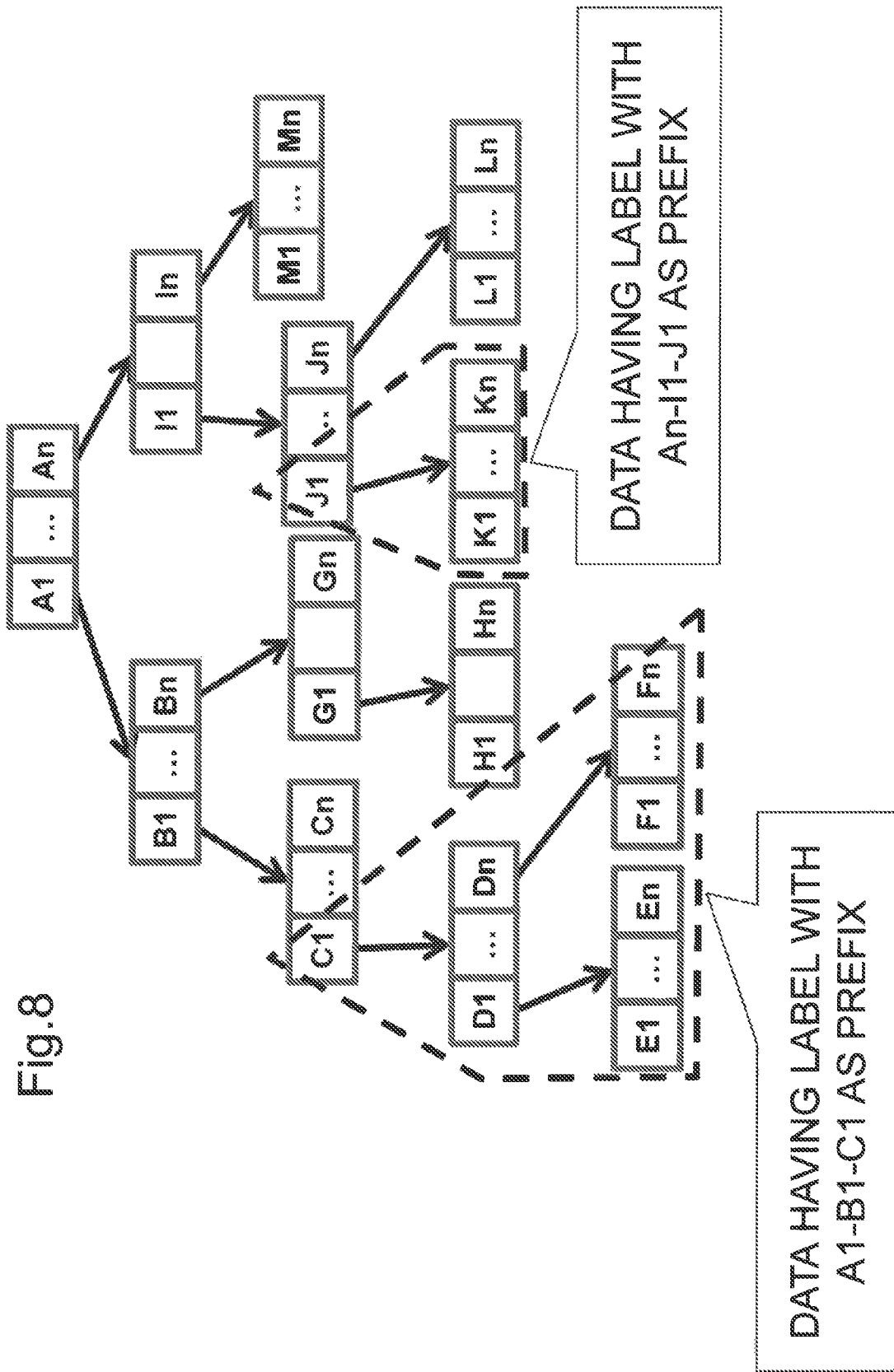
FIG. 8 is a diagram schematically illustrating a similarity index in a specific example of the second example embodiment of the present invention.

An example in which a path to a node of a third layer is applied as a prefix of a label in the similarity index in FIG. 5, for example, is illustrated in FIG. 8. In FIG. 8, an attribute value related to a similarity of data stored in a subtree at a node C1 and below is associated with a label having a prefix "A1-B1-C1". Moreover, an attribute value related to a similarity of data stored in a subtree at a node J1 and below is associated with a label having a prefix "An-I1-J1". Thus, the similarity calculation unit 24 implements hash join with the prefix "A1-B1-C1", the prefix "An-I1-J1", or the like as a redistribution key. Therefore, attribute values related to similarities of data associated with labels having the same prefix are collected in the same block by hash join.

Thereafter, in each block, the similarity calculation unit 24 needs only to reconfigure a similarity index by use of a label (step B22), and perform similar combinations in a block by use of the reconfigured similarity index (step B23).

Accordingly, the description of the specific example is ended.

Next, an advantageous effect of the second example embodiment of the present invention is described.

By use of attribute values related to similarities of data stored distributedly in a plurality of blocks, a similarity calculation device as the second example embodiment of the present invention is able to effectively execute a similarity-based calculation across blocks.

A reason for this is described as follows. In the present example embodiment, a data storage unit stores, distributedly in a plurality of blocks, information associating an attribute value related to a similarity of data with a label. Then, a similarity calculation unit redistributes the information associating the attribute value related to the similarity of the data with the label into a plurality of blocks, based on a prefix, and, for data indicated by information stored in each block, reconfigures a similarity index by use of a label. Then, for data indicated by information stored in each block, the similarity calculation unit executes a similarity-based calculation, by use of the reconfigured similarity index.

Note that, in the present example embodiment, the data storage unit may store a plurality of blocks in a plurality of physically different storage devices, respectively. In such case, by using a prefix of a label as a key for redistribution, the present example embodiment is able to apply an efficient hash join algorithm, and thus perform redistribution. As a result, the present example embodiment is able to efficiently collect data targeted for a similarity-based calculation in the same storage device. Thereby, the present example embodiment is able to increase efficiency of a similarity-based calculation under a distributed environment.

Third Example Embodiment

Next, a third example embodiment of the present invention is described in detail with reference to the drawings. Note that, the same reference signs are given to the same configurations as those in the first and second example embodiments of the present invention and steps operating in a similar way in each drawing referred to in a description of the present example embodiment, and a detailed description in the present example embodiment is thus omitted.

Figure 9:
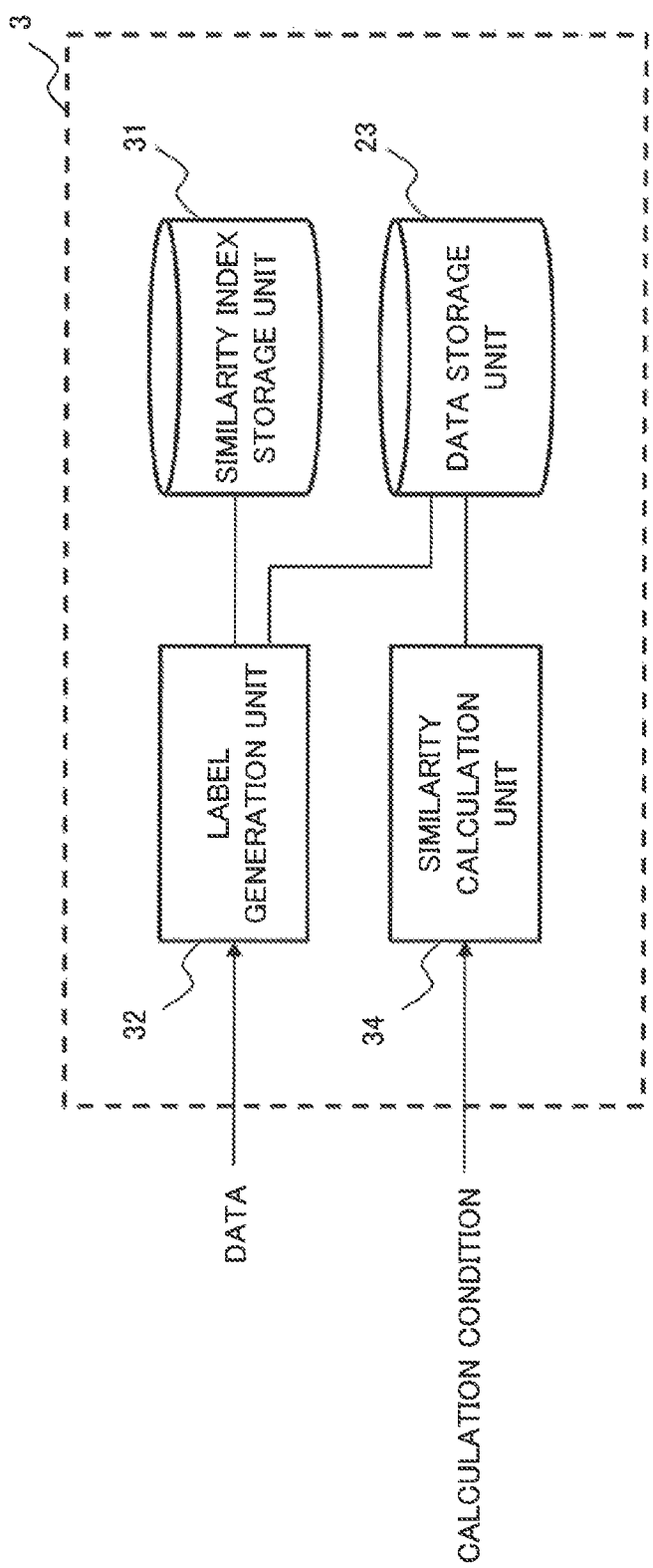
FIG. 9 is a block diagram illustrating a configuration of a similarity calculation device as a third example embodiment of the present invention.

First, a functional block configuration of a similarity calculation device 3 as the third example embodiment of the present invention is illustrated in FIG. 9. The similarity calculation device 3 is different from the similarity calculation device 2 in the second example embodiment of the present invention in that the similarity calculation device 3 includes a similarity index storage unit 31 instead of the similarity index storage unit 11, a label generation unit 32 instead of the label generation unit 12, and a similarity calculation unit 34 instead of the similarity calculation unit 24.

Note that the similarity calculation device 3 and each functional block thereof can be configured by the same hardware element as that in the first example embodiment of the present invention described with reference to FIG. 2. However, the hardware configurations of the similarity calculation device 3 and each functional block thereof are not limited to the configurations described above.

The similarity index storage unit 31 stores a similarity index. A similarity index is configured in such a way as to store, in any node and below, an attribute value related to a similarity of another piece of data a similarity of which to an attribute value related to a similarity of data stored in the node is equal to or more than a similarity threshold. In other words, in such a similarity index, a similarity threshold is set for a relationship between an attribute value related to a similarity of data stored in a certain node, and a child node thereof. As a similarity threshold, for example, a value representing that a similarity is higher in a lower hierarchical layer may be set.

The label generation unit 32 further includes, in a label, information representing a similarity threshold applied in a path indicating a position of a node storing an attribute value related to a similarity of data. For example, a label may be a character string in which, for each node included in a path from a root node to a corresponding node, information representing a set of a node, a placement order in a node, and a similarity threshold set for a relationship with a child node is linked in an order of arrangement in the path.

The similarity calculation unit 34 determines a prefix used during redistribution, based on information representing a similarity threshold included in a label. For example, as described above, it is assumed that a value representing that a similarity is higher in a lower hierarchical layer is set as a similarity threshold. Moreover, it is assumed that a similarity is higher when a similarity threshold is greater in value. In this case, the similarity calculation unit 34 may apply, as a prefix, a character string representing a path to a node to which a similarity threshold equal to or more than a predetermined value is applied, in a character string of a label. Then, the similarity calculation unit 34 executes redistribution of information and a similarity-based calculation by use of the determined prefix, in a way similar to the similarity calculation unit 24 in the second example embodiment of the present invention.

An operation of the similarity calculation device 3 configured as above is described with reference to the drawings.

Figure 10:
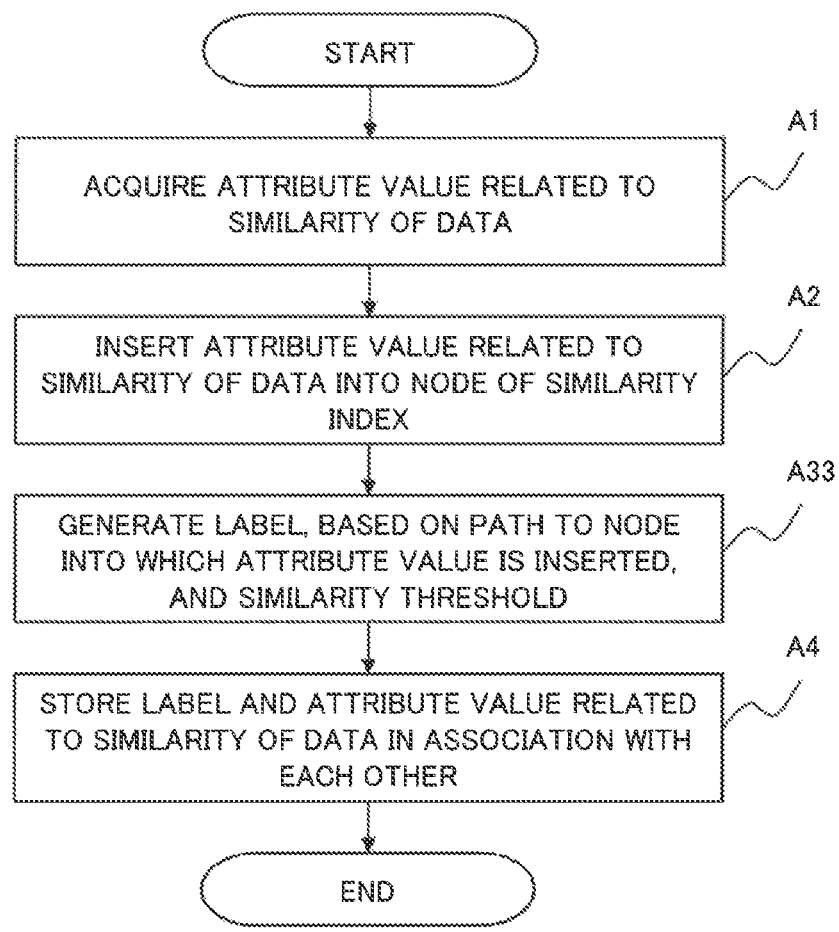
FIG. 10 is a flowchart illustrating an operation in which the similarity calculation device as the third example embodiment of the present invention stores information in a data storage unit.

First, an operation in which the similarity calculation device 3 stores information in the data storage unit 23 is illustrated in FIG. 10.

In FIG. 10, the similarity calculation device 3 operates as in the first example embodiment of the present invention from steps A1 to A2. Thereby, a newly acquired attribute value related to a similarity of data is inserted into a node of a similarity index stored in the similarity index storage unit 31.

Next, the label generation unit 32 generates a label, based on a path from a root node to the node into which the attribute value is inserted, and a similarity threshold applied in the path (step A33).

Thereafter, the similarity calculation device 3 executes step A4 as in the first example embodiment of the present invention. Thereby, the generated label including a similarity threshold, and an attribute value related to a similarity of target data are stored in the data storage unit 23 in association with each other.

Accordingly, the similarity calculation device 3 ends the operation of storing information in the data storage unit 23.

Figure 11:
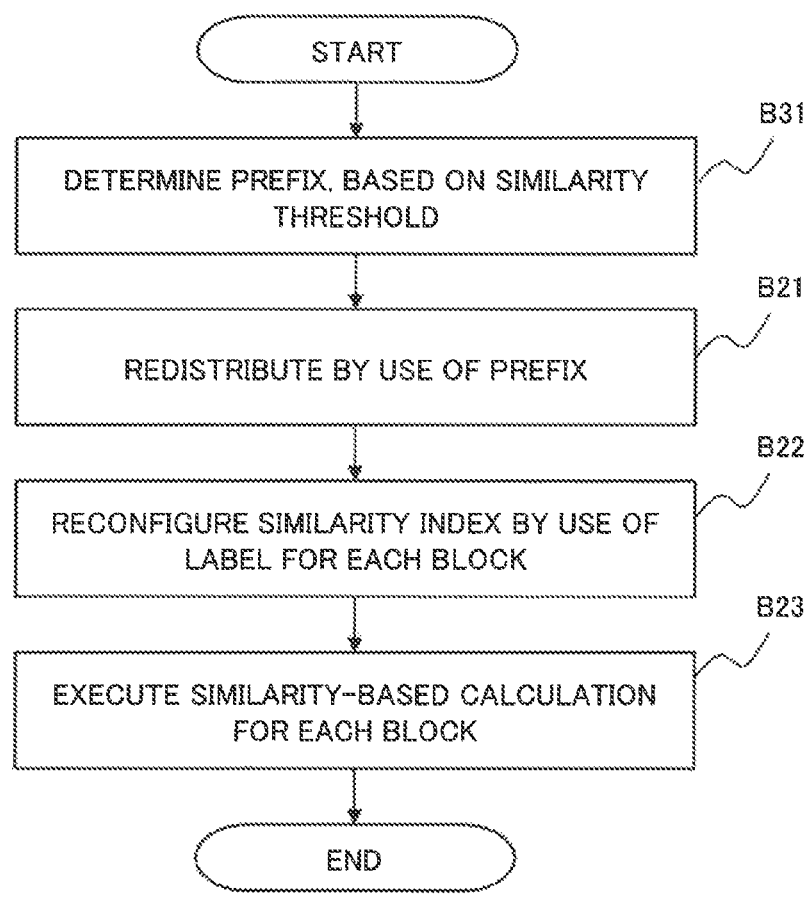
FIG. 11 is a flowchart illustrating an operation in which the similarity calculation device as the third example embodiment of the present invention executes a similarity-based calculation.

Next, an operation in which the similarity calculation device 3 performs a similarity-based calculation is illustrated in FIG. 11.

In FIG. 11, first, the similarity calculation unit 34 determines a prefix used for redistribution, based on a similarity threshold (step B31).

For example, in each path tracking a similarity index from a root, the similarity calculation unit 34 may determine, as a prefix, a character string representing a path up to where the similarity threshold exceeds a predetermined value.

Thereafter, the similarity calculation device 3 operates as in the second example embodiment of the present invention from step B21 to step B23. Thereby, a similarity index is reconfigured for each redistributed block, based on the prefix determined in step B31, and a similarity-based calculation is executed.

Accordingly, the similarity calculation device 3 ends the operation of performing a similarity-based calculation.

Next, a similarity-based calculation by the similarity calculation device 3 is presented with a specific example.

In this specific example, an example in which similar combinations are applied as a similarity-related calculation is described. Moreover, it is assumed that a condition that "a similarity is δq or more" is specified as a condition of similar combinations. It is also assumed that the data storage unit 23 stores, distributedly in a plurality of blocks, information associating an attribute value related to a similarity of data with a label. A case is described where, in this instance, similar combinations are performed in a block.

Figure 12:
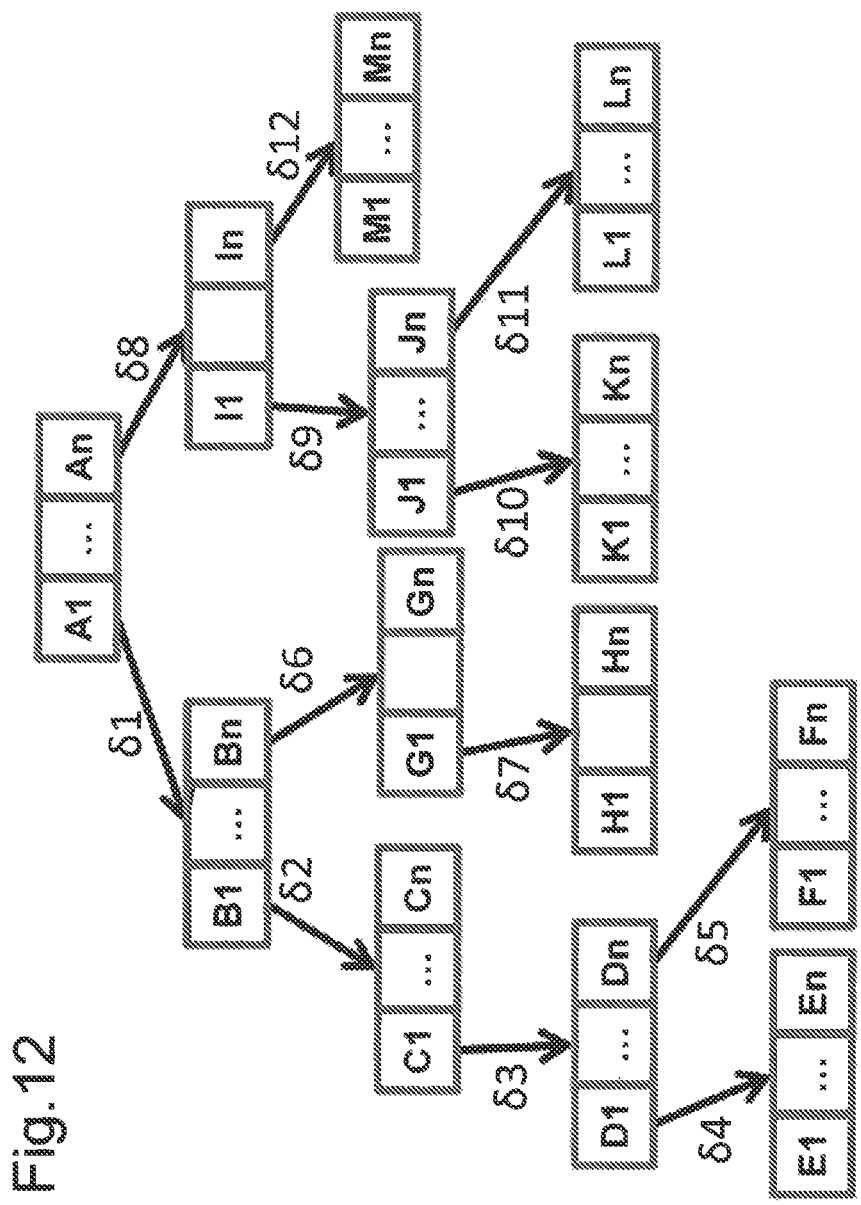
FIG. 12 is a diagram schematically illustrating a specific example of a similarity index in the third example embodiment of the present invention.

Furthermore, in this specific example, it is assumed that the similarity index storage unit 31 stores information illustrated in FIG. 12. A related technique that presents one example of such a similarity index is described in the following publicly known literature.

Publicly known literature: "written by Jianquan Liu, Shoji Nishimura, and Takuya Araki 'Efficient similarity search using tree structure index based on hierarchical relation of similarities' the 5th Forum on Data Engineering and Information Management (the 11th annual meeting of the Database Society of Japan) DEIM 2013, 2013/3/3, session A9-1, Internet <URL:http://db-event.jpn.org/deim2013/proceedings/index.html>"

As illustrated in FIG. 12, a similarity index presented in this publicly known literature stores, in any node and below, an attribute value related to a similarity of data which is equal to or more than a similarity threshold ($\delta x$) as compared with an attribute value related to a similarity of each piece of data stored in the node. In other words, data stored in all nodes in a subtree under an attribute value related to a similarity of data stored in the node A1 represent that a similarity to the data stored in the node A1 is more than $\delta 1$.

First, an operation in which information is stored in the data storage unit 23 in this specific example is described.

Herein, the label generation unit 32 acquires an attribute value related to a similarity of target data (step A1), and inserts the attribute value into a node of a similarity index stored in the similarity index storage unit 31 (step A2). Herein, it is assumed that the attribute value related to the similarity is inserted into the node C1.

Figure 13:
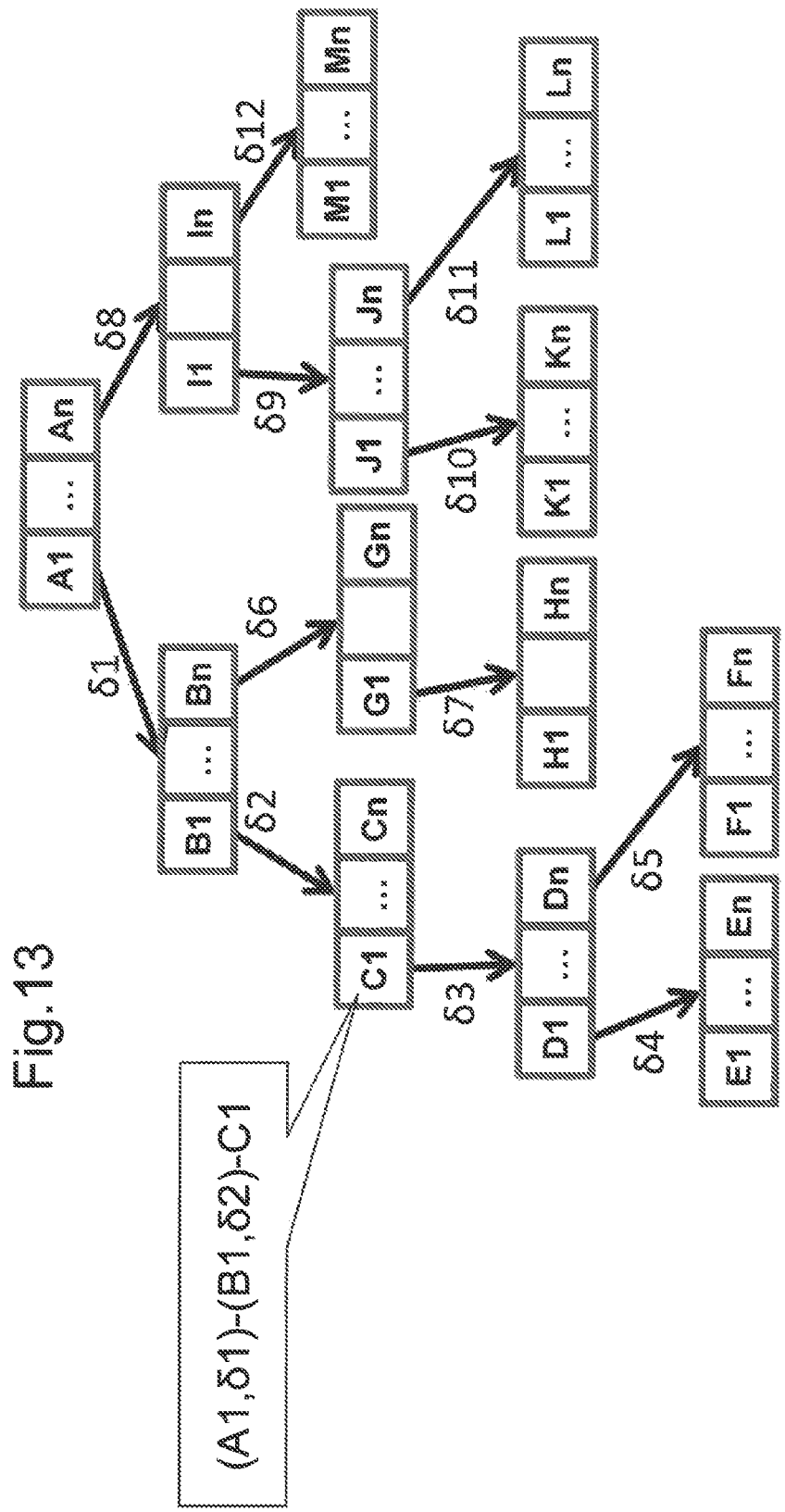
FIG. 13 is a diagram schematically illustrating a label given in a specific example of the third example embodiment of the present invention.

Next, as illustrated in FIG. 13, the label generation unit 32 generates a label by linking, as a character string, a path from the node A1 being a root node to the node C1 into which data are inserted, to a similarity threshold applied in the path. The generated label is "(A1, $\delta 1$)-(B1, $\delta 2$)-C1", as illustrated in FIG. 13.

Figure 14:
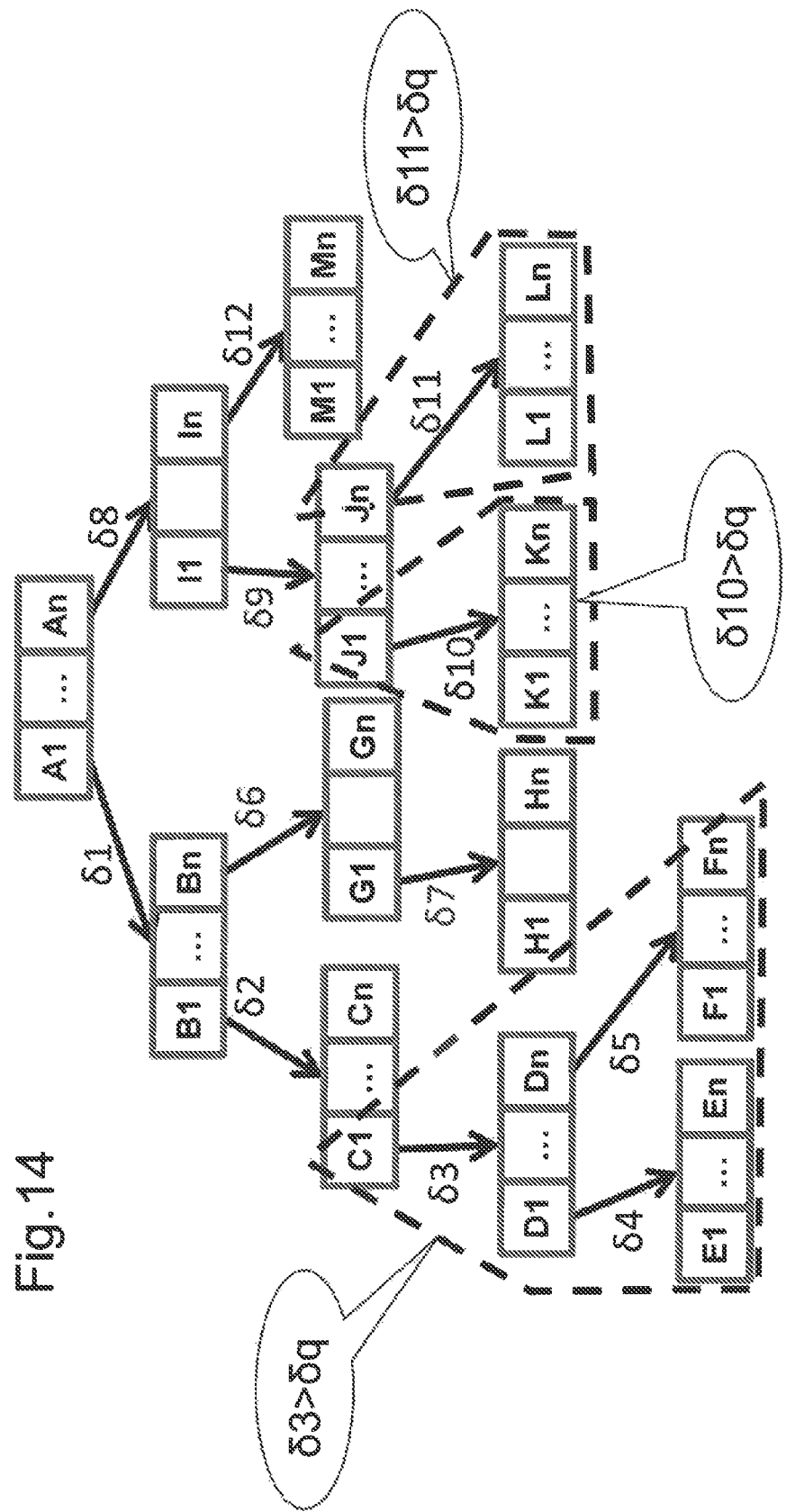
FIG. 14 is a diagram schematically illustrating data including a common prefix in a specific example of the third example embodiment of the present invention.

Next, in each path from a root of a similarity index, the similarity calculation unit 34 determines, as a prefix (i.e., a redistribution key), a character string up to an element in which a similarity threshold exceeds $\delta q$ for the first time (step B31). For example, as illustrated in FIG. 14, it is assumed that a similarity threshold exceeds $\delta q$ for the first time in three elements $\delta 3$, $\delta 10$, and $\delta 11$ in each path tracking from a root node to a leaf node. In this case, the similarity calculation unit 34 determines to use (A1, $\delta 1$)-(B1, $\delta 2$)-(C1, $\delta 3$), (An, $\delta 8$)-(I1, $\delta 9$)-(J1, $\delta 10$), and (An, $\delta 8$)-(I1, $\delta 9$)-(Jn, $\delta 11$) as redistribution keys.

Then, the similarity calculation unit 34 redistributes data by using the prefixes as redistribution keys. Thereby, in FIG. 14, data are redistributed for each subtree surrounded by a broken line (step B21).

Then, in each block, the similarity calculation unit 34 needs only to reconfigure a similarity index by use of a label (step B22), and perform similar combinations in a block by use of the reconfigured similarity index (step B23).

Accordingly, the description of the specific example is ended.

Next, an advantageous effect of the third example embodiment of the present invention is described.

A similarity calculation device as the third example embodiment of the present invention is able to more effectively execute a similarity-based calculation across blocks for data stored distributedly in a plurality of blocks.

A reason for this is described as follows. In the present example embodiment, a similarity index storage unit stores a similarity index configured in such a way as to store, in any node and below, an attribute value related to a similarity of data a similarity of which to an attribute value related to a similarity of data stored in the node is equal to or more than a similarity threshold. Then, a label generation unit generates, for each piece of data, a label including a path indicating a position of a node having stored therein the data in a similarity index, and information representing a similarity threshold applied in the path. Then, a similarity calculation unit determines a prefix used during redistribution, based on the information representing the similarity threshold included in the label.

In other words, by utilizing a similarity threshold included in a label, the present example embodiment is able to determine a more appropriate prefix for redistribution performed for a similarity-based calculation.

Fourth Example Embodiment

Next, a fourth example embodiment of the present invention is described in detail with reference to the drawings. In an example described in the present example embodiment, when data include another attribute in addition to an attribute related to a similarity, a similarity-based calculation is performed for data satisfying a condition related to another attribute.

First, a problem involved in the related technique described in PTL 1 set forth in Background Art in such a case is described. The above-described related technique significantly deteriorates efficiency of executing a similarity-based calculation. For example, it is assumed that data are a picture including a face image. In this case, a face image not only has a characteristic amount (an attribute related to a similarity of a multidimensional value) related to a face in the face image, but also has information (an attribute other than an attribute related to a similarity) such as a place where or time when the face image is taken. In this instance, since similar combinations having only a characteristic amount related to a face as a condition do not use an attribute related to a place or time, only applying the similarity index described in PTL 1 is sufficient.

On the other hand, suppose a case where a place and time are narrowed down, and then, similar combinations are performed with a characteristic amount related to a face as a condition. In this instance, when the similarity index described in PTL 1 is used, it is necessary to calculate similar combinations by a characteristic amount related to a face while determining whether or not an attribute related to a place or time of each piece of data satisfies a condition. This is because the similarity index described in PTL 1 increases efficiency of an operation related to a characteristic amount related to a face, but does not contribute to increasing efficiency of operations for other attributes. Thus, in the similarity index described in PTL 1, a condition related to another attribute needs to be individually determined for each piece of data.

Thus, it is assumed that data are divided into blocks for each range of a place or time in such a way as to increase efficiency of narrowing down by an attribute related to a place or time. In this instance, it is possible to efficiently execute the above-described inquiry by applying the similarity index described in PTL 1 within a range of each place or time, when a condition related to a place or time is within the range. This is because similar combinations can be executed for data narrowed down by another attribute by only referring to a block satisfying the condition of a place or time. However, when a condition for an attribute related to a place or time extends across ranges of blocks, the related technique described in PTL 1 causes inefficiency of similar combinations by a characteristic amount related to a face. This is because it is necessary to integrate, into one, similarity indices in the respective blocks satisfying the condition for an attribute related to a place or time. Since structures formed by the similarity indices of the individual blocks greatly depend on data inserted therein, this integration operation is substantially equivalent to newly constructing with a similarity index. Particularly, when a distributed environment is assumed, corresponding data are aggregated in one place, and a similarity index is then reconstructed, which therefore becomes a factor of significantly deteriorating performance.

In an example described below in the present example embodiment, the above-described problem of the related technique described in PTL 1 is solved when data also include another attribute in addition to an attribute related to a similarity.

Note that, the same reference signs are given to the same configurations as those in the first to third example embodiments of the present invention and steps operating in a similar way in each drawing referred to in a description of the present example embodiment, and a detailed description in the present example embodiment is thus omitted.

Figure 15:
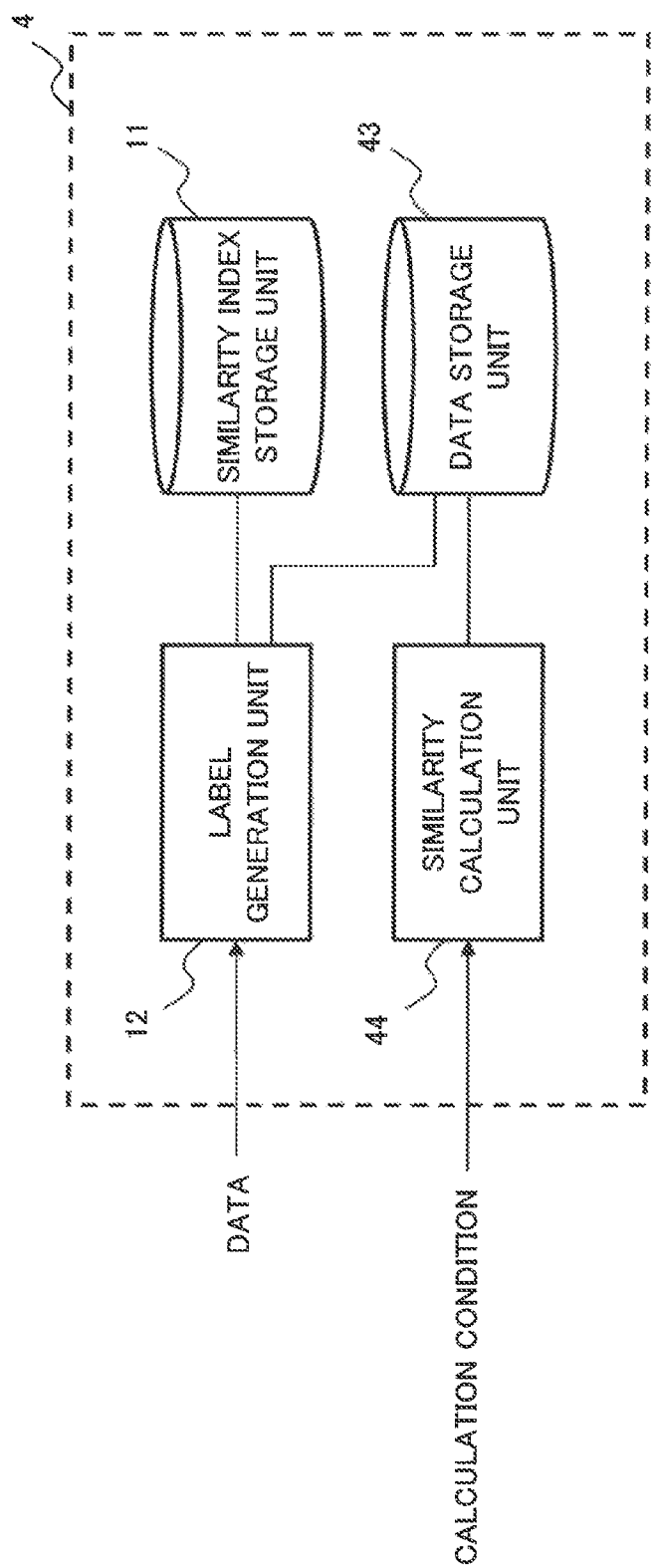
FIG. 15 is a block diagram illustrating a configuration of a similarity calculation device as a fourth example embodiment of the present invention.

First, a functional block configuration of a similarity calculation device 4 as the fourth example embodiment of the present invention is illustrated in FIG. 15. The similarity calculation device 4 is different from the similarity calculation device 2 in the second example embodiment of the present invention in that the similarity calculation device 4 includes a data storage unit 43 instead of the data storage unit 23, and a similarity calculation unit 44 instead of the similarity calculation unit 24.

Note that the similarity calculation device 4 and each functional block thereof can be configured by the same hardware element as that in the first example embodiment of the present invention described with reference to FIG. 2. However, the hardware configurations of the similarity calculation device 4 and each functional block thereof are not limited to the configurations described above.

In addition to information associating an attribute value related to a similarity of data with a label, the data storage unit 43 further stores, regarding the data, information which enables selection based on an attribute value other than an attribute value related to a similarity. For example, the data storage unit 43 may store, for each piece of data, information associating an attribute value related to a similarity, a label, and another attribute value with one another.

The similarity calculation unit 44 extracts information satisfying a selection condition related to another attribute value from the data storage unit 43. Then, by use of the extracted information, the similarity calculation unit 44 executes a similarity-based calculation using a similarity index which is reconfigured, based on a label.

An operation of the similarity calculation device 4 configured as above is described with reference to the drawings. Note that an operation in which the similarity calculation device 4 stores information in the data storage unit 43 is similar to the operation in the first example embodiment of the present invention described with reference to FIG. 3, and a description in the present example embodiment is thus omitted. However, it is assumed that, when information associating an attribute value related to a similarity with a label is added by a label generation unit 12, information about another attribute value included in the data is also added to the data storage unit 43 in an associated way.

Figures 16, 17:
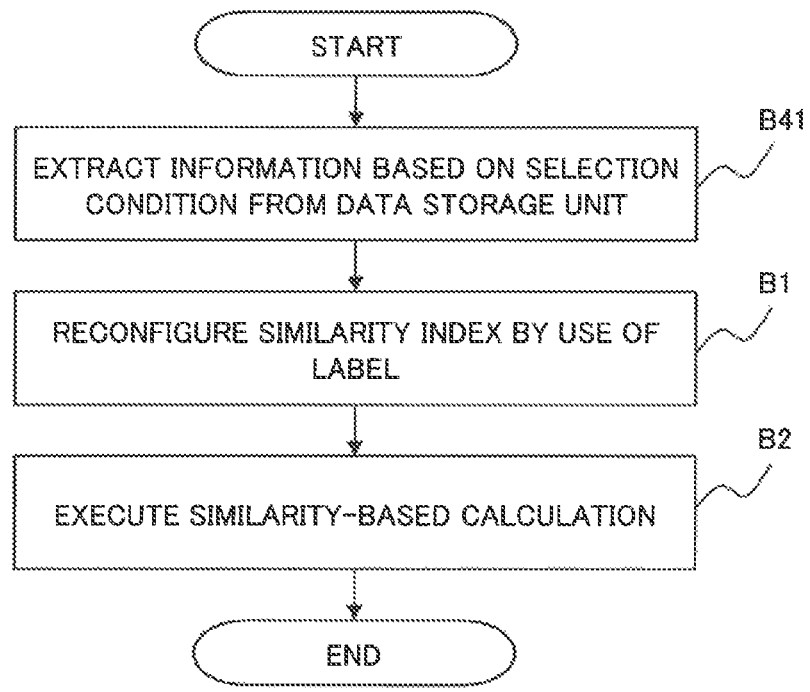
FIG. 16 is a flowchart illustrating an operation in which the similarity calculation device as the fourth example embodiment of the present invention executes a similarity-based calculation.
FIG. 17 is a diagram illustrating information stored in a data storage unit in a specific example of the fourth example embodiment of the present invention.

Herein, an operation in which the similarity calculation device 4 performs a similarity-based calculation is illustrated in FIG. 16.

In FIG. 16, first, the similarity calculation unit 44 extracts information satisfying a selection condition out of information stored in the data storage unit 43 (step B41).

Thereafter, the similarity calculation device 4 executes steps B1 to B2 by use of the extracted information as in the first example embodiment of the present invention. Thereby, a similarity index is reconfigured for data indicated by the information extracted in step B41, and a similarity-based calculation is executed.

Accordingly, the similarity calculation device 4 ends the operation of performing a similarity-based calculation.

Next, an operation of the similarity calculation device 4 is presented with a specific example.

Herein, an example in which similar combinations are applied as a similarity-related calculation is described. Moreover, it is assumed that data include two attributes which are a characteristic amount and time. A characteristic amount is an attribute value related to a similarity. Time is an attribute value other than an attribute value related to a similarity.

Furthermore, it is assumed that information is stored in the data storage unit 43 as in FIG. 17 by execution of the operation in FIG. 3. In FIG. 17, each row represents, for each piece of data, information associating a label which is generated, based on a similarity index of a characteristic amount, and time of the data. Note that each row further includes information representing a characteristic amount or reference information thereof, which is, however, not illustrated.

In this instance, the similarity calculation unit 44 extracts data satisfying a selection condition based on time, out of information illustrated in FIG. 17. If a selection condition is a condition that "time is within a range of 11:00 to 12:00", the similarity calculation unit 44 extracts information in the fifth to eighth rows (step B41).

Then, the similarity calculation unit 44 reconfigures a similarity index by use of a label for the information in the fifth to eighth rows (step B1).

Then, the similarity calculation unit 44 executes similar combinations by use of the reconfigured similarity index (step B2).

Furthermore, another specific example is described. In this example, the data storage unit 43 stores data in blocks in a divided way within a range of an attribute related to time, as illustrated in FIG. 18.

In this case, in step B41, the similarity calculation unit 44 acquires information about a block satisfying a selection condition given regarding time. Then, for data in the acquired block, the similarity calculation unit 44 needs only to reconfigure a similarity index, based on a label, and execute similar combinations. In this way, when a selection condition based on another attribute value is previously assumed, the data storage unit 43 may store data distributedly in a plurality of blocks, based on another attribute value.

Accordingly, the description of the specific example is ended.

Next, an advantageous effect of the fourth example embodiment of the present invention is described.

When performing a calculation based on a similarity of data, a similarity calculation device as the fourth example embodiment of the present invention easily enables a similarity index and any other index to coexist.

A reason for this is described as follows. In the present example embodiment, in addition to a configuration similar to that in the first example embodiment of the present invention, a data storage unit further stores information which enables selection of data, based on an attribute value other than an attribute value related to a similarity. Then, for data satisfying a selection condition related to another attribute value, the similarity calculation unit executes a similarity-based calculation, by use of a similarity index which is reconfigured, based on a label.

In this way, the present example embodiment facilitates reconfiguration of a similarity index for a subset of such data as to satisfy a selection condition based on another attribute value, by a label generated as in the first example embodiment of the present invention. In other words, the present example embodiment enables a combination of a similarity index by an attribute value related to a similarity and an index of another scheme. As a result, for a subset of data satisfying a selection condition based on another attribute value, the present example embodiment can easily determine a similarity in a reconfigured similarity index, and facilitates a similarity-based calculation.

Consequently, the present example embodiment is able to increase efficiency of a similarity-based calculation when a data set is large in scale and distributedly placed, and when there is a need for a calculation related to such a complicated similarity as to include a condition related to an attribute other than an attribute related to a similarity.

Note that, in the example mainly described in each of the above-described example embodiments of the present invention, the similarity index storage unit stores a similarity index having a tree structure. Without being limited thereto, a similarity index stored by the similarity index storage unit may have a forest structure which is a set of tree structures.

Furthermore, in the example mainly described in each of the above-described example embodiments of the present invention, a label generation unit generates, as a label, a character string in which a node and a character string representing a placement order in the node are linked by a hyphen in an order of arrangement included in a path. Without being limited thereto, the label generation unit needs only to generate such a label that data inserted in any subtree in a similarity index share a common prefix. For example, a label may be a link of placement orders in a node included in a path. For example, a label "1-3-2" may be generated for an attribute value placed second in a child node of an attribute value placed third in a child node of an attribute value placed first in a root node. Moreover, if a similarity index has a forest structure, the label generation unit needs only to number a tree, and generate a label from the number of the tree and a root node of the tree, based on a path indicating an insertion position of data.

Furthermore, in the example mainly described in each of the above-described example embodiments of the present invention, a similarity calculation unit executes similar combinations as a similarity-based calculation. However, a similarity-based calculation is not limited to similar combinations, and may be any other calculation performed by use of a similarity index.

Still further, in the example mainly described in each of the above-described example embodiments of the present invention, each functional block of the similarity calculation device is achieved by a CPU which executes a computer program stored in a memory. Without being limited thereto, part, all, or a combination of the respective functional blocks may be achieved by dedicated hardware.

Furthermore, in each of the above-described example embodiments of the present invention, functional blocks of the similarity calculation device may be achieved by being distributed into a plurality of devices.

Further yet, in each of the above-described example embodiments of the present invention, the operation of the similarity calculation device described with reference to each flowchart is stored in a storage device (storage medium) of a computer device as a computer program of the present invention. Then, the CPU may read and execute the computer program. Then, in such a case, the present invention is configured by a code of the computer program or a storage medium.

Further yet, the respective example embodiments described above can be appropriately combined and then implemented.

Further yet, the present invention is not limited to each of the above-described example embodiments, and may be implemented in various aspects.

The present invention has been described above with the above-described example embodiments as exemplars. However, the present invention is not limited to the example embodiments described above. In other words, various aspects that may be appreciated by a person skilled in the art may be applied to the above-described example embodiments within the scope of the present invention.

This application is based upon and claims the benefit of priority from Japanese Patent Application No. 2016-122509, filed on Jun. 21, 2016, the disclosure of which is incorporated herein in its entirety by reference.

REFERENCE SIGNS LIST 1, 2, 3, 4 Similarity calculation device
11, 31 Similarity index storage unit
12, 32 Label generation unit
13, 23, 43 Data storage unit
14, 24, 34, 44 Similarity calculation unit
1001 CPU
1002 Memory
1003 Output device
1004 Input device

What is claimed is:

1. A similarity calculation device comprising:
a memory storing therein a computer-program;
at least one processor to access the memory; and
similarity index storage storing a similarity index in which a node storing an attribute value related to a similarity of data comprising a first image of a first physical object and a second image of a second physical object is hierarchically configured in such a way as to represent a similarity relation between the data; wherein
the at least one processor executes the computer-program to implement:
generating, for each piece of the data, a label based on a path indicating a position of the node storing the attribute value in the similarity index;
the similarity calculation device further comprises:
data storage storing, for each piece of the data, information associating the attribute value with the label; and
the at least one processor is further configured to implement: for data indicated by whole or part of the information stored in the data storage, reconfiguring the similarity index, based on the label, and executing a similarity-based calculation targeted for the whole or part of the data by use of the reconfigured similarity index to determine whether the first physical object appearing in the first image is a same physical object as the second physical object appearing in the second image,
wherein, when the data storage stores, distributedly in a plurality of blocks, the information associating the attribute value with the label,
the at least one processor is further configured to implement redistributing the information associating the attribute value with the label in a plurality of blocks, based on a prefix of the label, then stores the information in the data storage, and, for data indicated by the information stored in each of redistributed blocks, executes the similarity-based calculation by use of the similarity index which is reconfigured, based on the label, to determine whether the first physical object appearing in the first image is a same physical object as the second physical object appearing in the second image, wherein the device improves efficiency in object recognition as to whether the first physical object within the first image is the same object as the second physical object within the second image via reconfiguration of the similarity index and execution of the similarity-based calculation target by use of the reconfigured similarity index.

2. The similarity calculation device according to claim 1, wherein the attribute value of another data is, in the similarity index, stored in a node at a hierarchical layer including a predetermined node or in a node at a hierarchical layer lower than the hierarchical layer including the predetermined node, the attribute value of another data being a value of which similarity to the attribute value of the data stored in the predetermined node is equal to or more than a similarity threshold, the at least one processor is further configured to implement;

including, in the label, information representing the similarity threshold applied in a path indicating a position of the node storing the attribute value of the data, and determining a prefix used during the redistribution, based on the information representing the similarity threshold included in the label.

3. The similarity calculation device according to claim 1, wherein the data storage further stores, for each piece of the data, information serving to enable selection based on another attribute value other than an attribute value related to the similarity, and the at least one processor is further configured to implement: executing, for data satisfying a selection condition related to the another attribute value, the similarity-based calculation by use of the similarity index which is reconfigured, based on the label.

4. A method comprising, by a computer device, by use of a similarity index in which a node storing an attribute value related to a similarity of data comprising a first image of a first physical object and a second image of a second physical object is hierarchically configured in such a way as to represent a similarity relation between the data:

generating, for each piece of the data, a label based on a path indicating a position of the node storing the attribute value in the similarity index;

storing, for each piece of the data, information associating the attribute value with the label in data storage; and reconfiguring, for data indicated by whole or part of the information stored in the data storage, the similarity index, based on the label, and executing a similarity-based calculation targeted for the whole or part of the data by use of the reconfigured similarity index, wherein storing, distributedly in a plurality of blocks, the information associating the attribute value with the label, redistributing the information associating the attribute value with the label in a plurality of blocks, based on a prefix of the label, and then storing the information, and, for data indicated by the information stored in each of redistributed blocks, executing the similarity-based calculation by use of the similarity index which is reconfigured, based on the label, to determine whether the first physical object appearing in the first image is a same physical object as the second physical object appearing in the second image, wherein the method improves efficiency in object recognition as to whether the first physical object within the first image is the same object as the second physical object within the second image via reconfiguration of the similarity index and execution of the similarity-based calculation target by use of the reconfigured similarity index.

5. A non-transitory storage medium storing a program which causes a computer device to execute, by use of a similarity index in which a node storing an attribute value related to a similarity of data comprising a first image of a first physical object and a second image of a second physical object is hierarchically configured in such a way as to represent a similarity relation between the data:

generating, for each piece of the data, a label based on a path indicating a position of the node storing the attribute value in the similarity index;

storing, for each piece of the data, information associating the attribute value with the label in data storage; and for data indicated by whole or part of the information stored in the data storage, reconfiguring the similarity index, based on the label, and executing a similarity-based calculation targeted for the whole or part of the data by use of the reconfigured similarity index, wherein storing, distributedly in a plurality of blocks, the information associating the attribute value with the label, redistributing the information associating the attribute value with the label in a plurality of blocks, based on a prefix of the label, and then storing the information, and, for data indicated by the information stored in each of redistributed blocks, executing the similarity-based calculation by use of the similarity index which is reconfigured, based on the label, to determine whether the first physical object appearing in the first image is a same physical object as the second physical object appearing in the second image, wherein the medium improves efficiency in object recognition as to whether the first physical object within the first image is the same object as the second physical object within the second image via reconfiguration of the similarity index and execution of the similarity-based calculation target by use of the reconfigured similarity index.

* * * * *